March 14, 1972  J. H. APFEL ET AL  3,649,359

MULTILAYER FILTER WITH METAL DIELECTRIC PERIOD

Filed Oct. 27, 1969

INVENTORS
Joseph H. Apfel
Robert M. Gelber
BY
Attorneys 3,649,359
MULTILAYER FILTER WITH METAL
DIELECTRIC PERIOD
Joseph H. Apfel, Santa Rosa, and Robert M. Gelber,
Rohnert Park, Calif., assignors to Optical Coating
Laboratory, Inc., Santa Rosa, Calif.
Filed Oct. 27, 1969, Ser. No. 869,737
Int. Cl. B44d 5/06; G02b 1/10
U.S. Cl. 117—33.3                                13 Claims

ABSTRACT OF THE DISCLOSURE

A multilayer filter with attenuation and a very low reflectance in the visible region having a substantially transparent substrate with a multilayer coating deposited thereon. The multilayer coating is comprised of a periodic structure and may include a substructure and an overstructure. The periodic structure has at least one metal dielectric period. The substructure and overstructure are such that the addition or subtraction of metal dielectric periods to the periodic structure does not change the magnitude and the phase of the reflectance from the filter but only modifies the transmittance of the filter.

BACKGROUND OF THE INVENTION

Neutral density filters have heretofore been provided. However, with such filters in the past, it has been very difficult to change the transmission without changing the magnitude and the phase of the reflectance. There is, therefore, need for new and improved multilayer filter which overcomes this disadvantage.

SUMMARY OF THE INVENTION AND OBJECTS

The multilayer filter consists of a substantially transparent substrate which has a multilayer coating deposited thereon. The multilayer coating consists of a periodic structure and may include a substructure in which the substructure is designed such that the magnitude and the phase of the reflectance of the filter is substantially unchanged by the addition of or subtraction of periods from the periodic structure. The periodic structure consists of at least one period with each period having at least two layers with one of the layers being a metal layer and the other layers being dielectric layers. The coating, in addition, may also consist of an overstructure which is deposited on the periodic structure to obtain the desired reflectance from the filter.

In general, it is an object of the present invention to provide a multilayer filter incorporating the present invention in which the transmittance can be varied while maintaining the reflectance substantially constant.

Another object of the invention is to provide a multilayer filter of the above character in which a periodic structure in which the number of periods can be changed to vary the transmittance.

Another object of the invention is to provide a filter of the above character in which additional periods can be added to the periodic structure without substantially changing the magnitude and phase of the reflectance from the filter.

Another object of the invention is to provide a filter which can be utilized for applications requiring attenuation and low reflectance in the visible region.

Additional objects and features of the invention will appear from the following description in which the preferred embodiments are set forth in detail in conjunction with the accompanying drawing.

DESCRIPTION OF THE PREFERRED EMBODIMENTS

Figure 1:
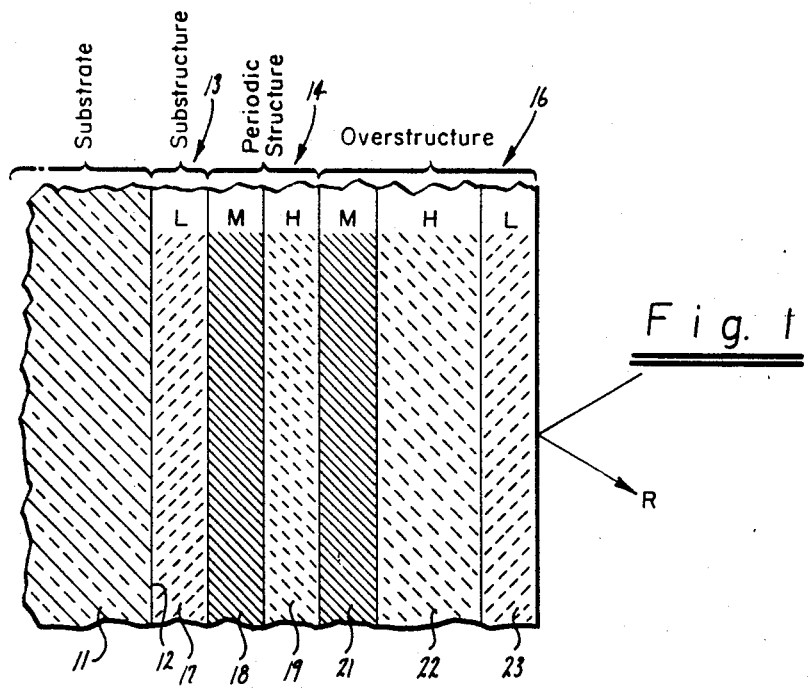
FIG. 1 is a cross-sectional view showing a typical multilayer filter incorporating the present invention.

A multilayer filter incorporating the present invention is shown in FIG. 1. It consists of a substrate 11 formed of a substantially transparent material such as glass which is provided with a surface 12. A substructure 13 is deposited on the surface 12. A periodic structure 14 is deposited upon the substructure 13 and an overstructure 16 is deposited on the periodic structure 14. As hereinafter explained, the overstructure and even the substructure can be eliminated in certain applications of the invention.

The substructure 13 consists of one or more layers and as shown in FIG. 1 consists of a single layer 17 formed of a suitable dielectric material having a low index refraction such as magnesium fluoride which has an index of refraction of 1.38. Other materials such as dielectrics and metals can be utilized. The substructure 13 changes the phase of the reflected energy to an appropriate value but has very little effect upon the magnitude or the intensity of the reflected energy.

The periodic structure 14 consists of at least one period in which each of the periods consists of one metal layer and at least one dielectric layer. Thus, as shown in FIG. 1, the periodic structure 14 consists of a single period in which there is provided a metal layer 18 and a single dielectric layer 19 of a suitable dielectric having a high index refraction. Any suitable metal can be utilized for the metal layer such as nickel. The metal must be of a type which can be deposited as a semitransparent thin film. Any suitable non-absorbing dielectric material can be utilized for the dielectric layer or layers of each period. The dielectric material should have indices of refraction ranging from 1.35 to 2.5. For example, the metal oxide such as described in the United States Letters Patent No. 3,034,924 and having index refraction of 2.08 can be utilized.

The layer 17 can have an optical thickness ranging from $\frac{1}{8}$ to $\frac{1}{2}$ of the design wavelength but preferably a thickness of one quarter of the design wavelength for the filter. In the periodic structure, the layer 18 can have a physical thickness ranging from 10 to 500 angstroms and the layer 19 can have an optical thickness ranging from $\frac{1}{8}$ to $\frac{1}{2}$ of the design wavelength.

The overstructure 16 consists of three layers 21, 22 and 23. The layer 21 is formed of a suitable metal of the type hereinbefore described such as nickel. The metal layer 21 should have a physical thickness ranging from 10 to 500 angstroms and preferably has a thickness approximately 100 angstroms or in other words a thickness which gives approximately 50 percent transmission. The layer 22 is formed of a suitable dielectric material having a high index of refraction ranging from 1.6 to 2.4 and an optical thickness ranging from $\frac{1}{8}$ to $\frac{1}{2}$ of the design wavelength. One material found to be particularly suitable for this overstructure is a metal oxide described in U.S. Letters Patent No. 3,034,924 which has an index refraction of 2.08. The layer 23 is formed of a dielectric having a low index refraction ranging from 1.35 to 1.55 and an optical thickness ranging from $\frac{1}{8}$ to $\frac{1}{2}$ of the design wavelength. Magnesium fluoride having an index refraction of 1.38 was found to be particularly suitable for this layer.

Figure 2:
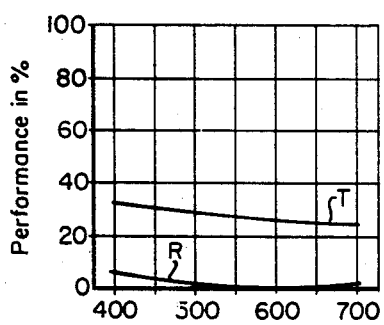
FIGS. 2 through 4 are graphs showing the measured transmittance and reflectance of certain filters made in accordance with the present invention.
Figure 3:
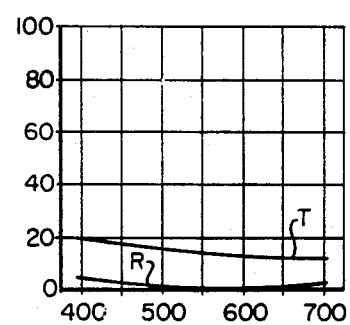
Figure 4:
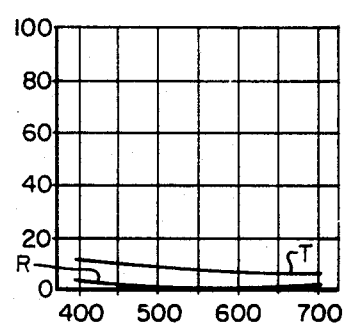

The characteristics of a number of multilayer filters which were constructed in accordance with the present invention are shown in the graphs in FIGS. 2 through 4. The design which was utilized to obtain the characteristics shown in FIG. 2 had six layers of the construction which is shown in FIG. 1. The substrate was glass and had an index refraction of 1.5. The medium in which the filter was disposed was air and has an index refraction of 1.0. The layers which are utilized counting from the medium to the substrate had the following characteristics with the physical thickness and optical thickness expressed as nanometers:

| Layer | Material | Index of refraction | Physical thickness | Quarter wave optical thickness |
|---|---|---|---|---|
| 1 | Magnesium fluoride | 1.38 | 56.94 | 314.3088 |
| 2 | Metal oxide | 2.08 | 40.46 | 336.6272 |
| 3 | Nickel | (1) | 11.50 | |
| 4 | Metal oxide | 2.08 | 58.67 | 488.1344 |
| 5 | Nickel | (1) | 11.50 | |
| 6 | Magnesium fluoride | 1.38 | 153.05 | 844.8360 |

1 See Table 1 below.

TABLE 1

| | Complex index of refraction | |
|---|---|---|
| Wavelength | Real part | Imaginary part |
| 400 | 2.17 | 1.75 |
| 500 | 2.34 | 2.17 |
| 600 | 2.57 | 2.51 |
| 700 | 3.16 | 2.58 |

The transmission and reflection for this filter is shown in FIG. 2. The reflectance was measured from the medium or air side. From the graph it can be seen that the reflection was 0 at the design wavelength of 550 nanometers and in fact is nearly 0 over the major portion of the visible spectrum. The filter had a transmission of approximately 24%.

The filter for obtaining the characteristics as shown in FIG. 3 has a construction similar to the filter utilized for obtaining the characteristics shown in FIG. 2 with the exception that it consisted of eight layers rather than six layers. The substructure and the overstructure were identical. The periodic structure differed in that it included two periods rather than just one period. The layers have the following characteristics as set forth in the chart below counting from the medium to the substrate.

| Layer | Material | Index of refraction | Physical thickness | Quarter wave optical thickness |
|---|---|---|---|---|
| 1 | Magnesium fluoride | 1.38 | 56.94 | 314.3088 |
| 2 | Metal oxide | 2.08 | 40.46 | 336.6272 |
| 3 | Nickel | (1) | 11.50 | |
| 4 | Metal oxide | 2.08 | 58.67 | 488.1344 |
| 5 | Nickel | (1) | 11.50 | |
| 6 | Metal oxide | 2.08 | 58.67 | 488.1344 |
| 7 | Nickel | (1) | 11.50 | |
| 8 | Magnesium fluoride | 1.38 | 153.05 | 844.8360 |

1 See Table 1.

The substrate was last and had an index refraction of 1.5.

As can be seen from FIG. 3, the result in the reflectance was again 0 at the design wavelength and in fact was substantially 0 over the total of the visible spectrum. The transmission, however, was reduced to approximately one-half of that shown in FIG. 1 to 12 percent through the visible spectrum.

In visibly observing the coating for the characteristics shown in FIG. 2, it was found that in viewing the filter from the overstructure or medium side that the filter had a slight bluish tint. In transmission, the filter was neutral and had a greyish appearance. The filter which was utilized to obtain the characteristics in FIG. 3 again had a very low reflectance with a slight bluish appearance from the medium side. The transmission was a neutral grey with a somewhat lower value than that which is obtainable for the design for FIG. 2.

The design for obtaining the characteristics which are shown in FIG. 4 was identical to that used in the previous two designs with the exception that it consisted of 10 layers with the substructure and overstructure being identical but with the periodic structure having three metal dielectric periods rather than the single dielectric period for FIG. 2 and the double dielectric period for FIG. 3. The layers counting from the medium to the substrate had the following characteristics set forth in the chart below.

| Layer | Material | Index of refraction | Physical thickness | Quarter wave optical thickness |
|---|---|---|---|---|
| 1 | Magnesium fluoride | 1.38 | 56.94 | 314.3088 |
| 2 | Metal oxide | 2.08 | 40.46 | 336.6272 |
| 3 | Nickel | (1) | 11.50 | |
| 4 | Metal oxide | 2.08 | 58.67 | 488.1344 |
| 5 | Nickel | (1) | 11.50 | |
| 6 | Metal oxide | 2.08 | 58.67 | 488.1344 |
| 7 | Nickel | (1) | 11.50 | |
| 8 | Metal oxide | 2.08 | 58.67 | 488.1344 |
| 9 | Nickel | (1) | 11.50 | |
| 10 | Magnesium fluoride | 1.38 | 153.05 | 844.8360 |

1 See Table 1.

As can be seen from FIG. 4, the reflectance remains zero at the design wavelength and substantially zero throughout the visible spectrum. The transmission, again has been reduced to one-half the preceding value to approximately 6 percent.

From the foregoing designs, it can be seen that the single layer 17 in the substructure serves the purpose of changing the reflectance from that of the uncoated substrate to a value which is required for use with the periodic structure such that additional periods can be added to the periodic structure without changing the value of the reflectance. In other words, the reflectance of the filter should be unchanged from one filter to the other even though the only change in the filter is the addition or elimination of periods from the periodic structure. By way of example, if the filter had a strong color such as green, such a filter could be made with one, two, three or additional periods in the periodic structure without changing the reflected color. The transmission, however, would in each case be changed and would be reduced as the number of periods is increased. Thus, it can be seen that the characteristics of the substructure and the overstructure are dictated by the desired results from the overall filter. They are not absolutely essential to the periodic phenomenon which has been obtained with the present invention wherein which there is achieved a very low reflectance over the whole visible spectrum. For certain values of reflectance and for many colors, it will not be necessary to utilize any layers in the substructure or the overstructure. However, in most cases, the substructure will be necessary.

In general, the substructure and the overstructure give the end result insofar as the reflectance desired and the periodic structure is used to modify the transmittance. Normally if a certain periodic structure is chosen then the design of the substructure and the overstructure can be determined depending upon the end reflectance desired. The reflectance ($r_2$) of the substructure ($r_2$) must satisfy the formula $$s_1 r_2^2 + (t_1^2 - r_1 s_1 - 1) r_2 + r_1 = 0$$

where $r_1$, $s_1$ and $t_1$ are the front side reflectance, the back side reflectance and the transmittance of the metal dielectric period. The terms used in this formula are "complex," that is, each term has a real and an imaginary component or one may say that each has amplitude and phase.

In considering the substructure for absorbing periods, it should be understood that an absorbing layer which when added to a unique substructure will not change the reflectance amplitude and phase. In other words, the complex reflectance of the substructure plus period is identical to that of the substructure alone.

The question arises: "Given a multilayer period, what is the proper substructure". In general, one designs the period and the substructure simultaneously, however it is possible to deduce the proper substructure from the properties of the period.

A general multilayer can be described by reflection and transmission. Thus, the terms $r$, $s$ and $t$, referring to front side reflectance, back side reflectance and transmittance adequately describe any multilayer for the purposes of determining its behavior in a radiation environment. The terms $r$, $s$ and $t$ are generally complex numbers having amplitude and phase.

If two multilayers are combined, the system is equivalent to a single multilayer in which the reflectance is $$r = \frac{r_1 + r_2(t_1^2 - r_1 s_1)}{1 - r_2 s_1}$$

where the subscripts identify to the two original multilayers.

If the substructure is system 2 and the absorbing period is system 1, the period definition requires that overall reflectance ($r$) be equal to substructure reflectance ($r_2$). The above formula then becomes $$r_2 = \frac{r_1 + r_2(t_1^2 - r_1 s_1)}{1 - r_2 s_1}$$

which can be rearranged to the form $$s_1 r_2^2 + (t_1^2 - r_1 s_1 - 1) r_2 + r_1 = 0$$

The solution of this equation for $r_2$, when given the properties of the absorbing period ($r_1$, $s_1$, and $t_1$), yields the required substructure reflectance.

Although the period for the periodic structure has been disclosed of consisting of first a metal and then a dielectric layer, it should be appreciated that this order can be reversed and that the dielectric can be first and the metal layer can be second. Also, it should be appreciated that although it is contemplated that only one metal layer be utilized in each period, that it is possible that additional dielectric layers can be utilized in each period.

It is apparent from the foregoing that there has been provided a new and improved filter which is particularly useful in keeping the reflectance at a desired value such as substantially zero throughout the visible spectrum while making it possible to change the transmittance merely by changing the number of periods in the periodic structure.

We claim:

1. In a multilayer filter, a substantially transparent substrate having a surface and a multilayer coating disposed on said surface, said multilayer coating comprising a periodic structure with at least one period with each period having at least two layers, with one layer being formed of metal and another of the layers being formed of dielectric, said periodic structure being characterized in that the addition or removal of a period serves to change the transmittance of the coating while keeping the reflectance substantially constant.

2. The filter as in claim 1 wherein said periodic structure comprises two periods.

3. A filter as in claim 1 wherein said periodic structure comprises three periods.

4. A filter as in claim 1 wherein said multilayer coating also includes a substructure disposed between the surface and the periodic structure, said substructure serving to provide the desired reflectance for use with the periodic structure and being formed of a dielectric material having a low index refraction ranging from 1.35 to 1.55.

5. A filter as in claim 4 wherein said substructure has a layer formed of magnesium fluoride having an index refraction of 1.38 and having an optical thickness of approximately 844 nanometers.

6. A filter as in claim 1 wherein said multilayer coating include an overstructure disposed on the periodic structure, said overstructure being formed of at least one layer.

7. A filter as in claim 6 wherein said overstructure is formed of three layers, one of said layers being formed of metal, another layer being formed of a material having a high index refraction, the other of said layers being formed of a material having a low index refraction.

8. A filter as in claim 1 wherein said metal in said periodic structure is nickel and wherein said dielectric layer has a high index refraction ranging from 1.6 to 2.4.

9. A filter as in claim 8 wherein said material is a metal oxide and has an index refraction of approximately 2.1.

10. In a multilayer filter, a substantially transparent substrate having a surface and a multilayer coating carried by the substrate, said multilayer coating comprising a substructure deposited upon the surface and a periodic structure deposited upon the substructure, said periodic structure having at least two layers with one of the layers being formed of a metal and the other of the layers being formed of a dielectric having a high index refraction, said substructure being formed of a dielectric material having a low index refraction serving to modify the phase of the reflected energy so that the number of periods in the periodic structure can be changed without substantially changing the energy reflected by the filter.

11. A filter as in claim 10 wherein said multilayer coating includes an overstructure deposited upon the periodic structure and wherein said overstructure includes at least one layer of low index material having an index refraction ranging from 1.35 to 1.55.

12. A filter as in claim 11 wherein said overstructure is formed of three layers with the layer next to the medium being formed of a dielectric material having a low index refraction ranging from 1.35 to 1.55, the second layer from the medium being formed of a dielectric material having a high index refraction ranging from 1.6 to 2.4 and the third layer, counting from the medium being formed of a metal.

13. A filter as in claim 12 wherein the layer in the substructure is formed of magnesium fluoride, wherein the metal in the periodic structure is nickel and the dielectric material in the periodic structure is a metal oxide and wherein the low index material in the overstructure is a magnesium fluoride, the high index material in the overstructure is a metal oxide and the metal in the overstructure is nickel.

References Cited

UNITED STATES PATENTS

| | | | |
|---|---|---|---|
| 2,552,184 | 5/1951 | Koch | 350—166 |
| 2,552,185 | 5/1951 | Koch | 117—33.3 |
| 2,628,927 | 2/1953 | Colbert et al. | 117—124 X |
| 2,676,117 | 4/1954 | Colbert et al. | 117—124 X |
| 2,750,832 | 6/1956 | Morgan | 117—33.3 X |
| 2,758,510 | 8/1956 | Anwarter | 350—166 |
| 2,761,767 | 9/1956 | Young | 350—166 |
| 2,808,351 | 10/1957 | Colbert et al. | 117—33.3 |
| 3,004,875 | 10/1961 | Lytle | 117—33.3 |
| 3,034,924 | 5/1962 | Kraus et al. | 117—33.3 X |
| 3,042,542 | 7/1962 | Anders | 350—166 X |
| 3,423,147 | 1/1969 | Thelen | 350—166 |
| 3,514,174 | 5/1970 | Gans et al. | 117—33.3 |

WILLIAM D. MARTIN, Primary Examiner

M. R. P. PERRONE, Jr., Assistant Examiner

U.S. Cl. X.R.

117—71 R, 124 A, 124 B, 124 C; 350—165, 166